US008346161B2

(12) United States Patent
Sogabe et al.

(10) Patent No.: US 8,346,161 B2
(45) Date of Patent: Jan. 1, 2013

(54) SATELLITE COMMUNICATION SYSTEM

(75) Inventors: Yasushi Sogabe, Tokyo (JP); Akinori Fujimura, Tokyo (JP); Takashi Kuwahara, Tokyo (JP); Futaba Ejima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 518 days.

(21) Appl. No.: 12/301,349

(22) PCT Filed: May 15, 2007

(86) PCT No.: PCT/JP2007/059984
§ 371 (c)(1),
(2), (4) Date: Nov. 18, 2008

(87) PCT Pub. No.: WO2007/135902
PCT Pub. Date: Nov. 29, 2007

(65) Prior Publication Data
US 2009/0191810 A1  Jul. 30, 2009

(30) Foreign Application Priority Data
May 22, 2006 (JP) ................. 2006-142102

(51) Int. Cl.
*H04B 7/185* (2006.01)
(52) U.S. Cl. ............ 455/12.1; 455/13.1; 455/13.2; 455/63.1; 455/427; 455/436; 455/13.4; 455/422.1; 455/428; 370/357; 370/352; 370/353; 370/354
(58) Field of Classification Search ............. 455/12.1, 455/13.1, 13.3, 63.1, 427, 436, 13.2, 13.4, 455/422.1, 428; 375/130; 370/316, 320, 370/357, 352, 353, 354
See application file for complete search history.

(56) References Cited

U.S. PATENT DOCUMENTS

| 5,619,525 | A | * | 4/1997 | Wiedeman et al. | 375/130 |
| 5,634,190 | A | * | 5/1997 | Wiedeman | 455/13.1 |
| 5,638,399 | A | * | 6/1997 | Schuchman et al. | 370/324 |
| 5,649,291 | A | * | 7/1997 | Tayloe | 370/332 |

(Continued)

FOREIGN PATENT DOCUMENTS
JP      6-53872     2/1994
(Continued)

OTHER PUBLICATIONS

Mitsugi, J. et al., "Satellite On-Board Technologies for Next Generation Mobile Satellite Communication Systems", The Institute of Electronics, Information and Communication Engineers, vol. 103, No. 385, pp. 39-45 (2003).

(Continued)

*Primary Examiner* — Temesgh Ghebretinsae
*Assistant Examiner* — MD Talukder
(74) *Attorney, Agent, or Firm* — Oblon, Spivak, McClelland, Maier & Neustadt, L.L.P.

(57) ABSTRACT

When a transmission request for new data is issued under a situation where a plurality of data are transmitted to a specific service area from a plurality of service areas, a feeder link station searches an available frequency to be allocated to the new data in a down-link frequency band of the specific service area, and when any of data communications is completed, allocates a down-link frequency band used in the data communication as a down-link frequency band for the new data. A satellite repeater arranges the new data on the down-link frequency band right after the data communication is completed following a relay control by the feeder link station.

10 Claims, 9 Drawing Sheets

U.S. PATENT DOCUMENTS

| | | | |
|---|---|---|---|
| 5,758,261 A * | 5/1998 | Wiedeman | 455/13.1 |
| 5,841,765 A * | 11/1998 | Fielding et al. | 370/319 |
| 6,704,543 B1 * | 3/2004 | Sharon et al. | 455/12.1 |
| 6,791,952 B2 * | 9/2004 | Lin et al. | 370/281 |
| 6,842,437 B1 * | 1/2005 | Heath | 370/322 |
| 6,904,265 B1 * | 6/2005 | Valdivia et al. | 455/12.1 |
| 7,609,666 B2 * | 10/2009 | Karabinis | 370/316 |
| 2001/0005680 A1 * | 6/2001 | Sih et al. | 455/456 |
| 2002/0004369 A1 * | 1/2002 | Kelly et al. | 455/12.1 |
| 2002/0168973 A1 * | 11/2002 | Dent et al. | 455/427 |
| 2003/0032391 A1 * | 2/2003 | Schweinhart et al. | 455/12.1 |
| 2003/0054760 A1 * | 3/2003 | Karabinis | 455/12.1 |
| 2005/0164701 A1 * | 7/2005 | Karabinis et al. | 455/428 |
| 2005/0221757 A1 * | 10/2005 | Karabinis | 455/12.1 |
| 2005/0239399 A1 * | 10/2005 | Karabinis | 455/3.02 |
| 2005/0239403 A1 * | 10/2005 | Karabinis | 455/12.1 |
| 2005/0239404 A1 * | 10/2005 | Karabinis | 455/12.1 |
| 2005/0239457 A1 * | 10/2005 | Levin et al. | 455/431 |
| 2005/0260947 A1 * | 11/2005 | Karabinis et al. | 455/12.1 |
| 2006/0262724 A1 * | 11/2006 | Friedman et al. | 370/235 |
| 2006/0276129 A1 * | 12/2006 | Karabinis | 455/13.3 |
| 2009/0252048 A1 * | 10/2009 | Liang et al. | 370/252 |
| 2009/0290530 A1 * | 11/2009 | Dankberg et al. | 370/316 |
| 2009/0298416 A1 * | 12/2009 | Dankberg et al. | 455/3.02 |
| 2010/0304668 A1 * | 12/2010 | Kim et al. | 455/12.1 |

FOREIGN PATENT DOCUMENTS

| | | |
|---|---|---|
| JP | 2003-510951 | 3/2003 |

OTHER PUBLICATIONS

Petr, D. et al., "Modeling and Simulation of the Resource Allocation Process in a Bandwith-On-Demand Satellite Communications Network", IEEE Journal on Selected Areas in Communications, vol. 10, No. 2, pp. 465-477 (1992).

Tho LE-NGOC, "Switching for IP-Based Multimedia Satellite Communications", IEEE Journal on Selected Areas in Communications, vol. 22, No. 3, XP011110196, Apr. 1, 2004, pp. 462-471.

Office Action issued Aug. 2, 2010, in Japan Patent Application No. 2008-516616 (with English translation).

* cited by examiner

SATELLITE COMMUNICATION SYSTEM

TECHNICAL FIELD

The present invention relates to a satellite communication system, and particularly relates to a satellite communication system that achieves improvement in efficiency in a use of frequency by compressing a frequency bandwidth of a down-link from a satellite.

BACKGROUND ART

FIG. 7 is a schematic diagram that depicts a general configuration of a satellite communication system. A feeder link station 4 is a base station for controlling a satellite repeater 5, and each of terminal stations 6 and 7 present in service areas 1 to 3. In this case, it is assumed that the satellite communication system is a single-hop system, although in a case of a double-hop system where communication is established between terminals via a feeder link, the feeder link station 4 sends and receives a communication through a communication channel from each of the terminals.

A plurality of terminal stations (for example, a small satellite station, a mobile phone terminal, an aircraft, a bullet train, or a ship) that use a service of the satellite communications are in the service areas 1 to 3. It is conceivable a case where one service area includes a plurality of terminals. For simplifying explanations, in this case, it is assumed that the satellite communication system includes three service areas, although a system that includes tens of service areas is conceivable because of recent achievement of a multi-beam system.

The feeder link station 4 establishes communications between service areas via a satellite, or communications between a service area and the feeder link station by controlling connections between terminals via the satellite repeater 5 and controlling a transmission and a receipt between terminals present in the service areas 1 to 3.

According to FIG. 7, communication channels 11 to 13 and 71 to 73 between the service areas 1 to 3 and the satellite repeater 5 are referred to as service links, and communication channels 14 and 74 between the feeder link station 4 and the satellite repeater 5 are referred to as feeder links. The service links 11 to 13 and the feeder link 14 from the terminals in the service areas 1 to 3 and the feeder link station 4 toward the satellite repeater 5 constitute an up-link beam, and links from the satellite repeater 5 toward the terminals in the service areas 1 to 3 and the feeder link station 4, namely, the service links 71 to 73 and the feeder link 74, constitute a down-link beam.

FIG. 8 is a schematic diagram that depicts a sequence in a case where the terminal station 6 in the service area 1 carries out a communication with the terminal station 7 present in the service area 3 as a concrete example of a communication sequence of the system.

The terminal station 6 in the service area 1 transmits a transmission request signal to the feeder link station 4 via the satellite repeater 5 (Step S1). The transmission request signal includes information about a bandwidth desired to be used, a transmission destination (the terminal station 7), and a transmission source (the terminal station 6), as well as transmission request information.

The feeder link station 4 has grasped all terminals connected to the system and a state of the use of frequencies in each service area, and when receiving the transmission request signal from the terminal station 6, the feeder link station 4 examines at first whether the terminal station 7 as the transmission destination exists in the system (Step S2).

If the terminal station 7 exists in the system (Yes at Step S2), the feeder link station 4 examines whether allocation of a frequency band in accordance with the request from the terminal station 6 is available on both an up-link (from the terminal station 6 to the satellite repeater 5), and an down-link (from the satellite repeater 5 to the terminal station 7) (Steps S3 and S4: examining an available frequency). If the terminal station 7 does not exists in the system (No at Step S2), the processing is terminated.

When the allocation of a frequency band is available on both the up-link and the down-link (Yes at Step S4), the feeder link station 4 then transmits a transmission request signal to the terminal station 7 in the service area 3 via the satellite repeater 5 (Step S5). The transmission request signal includes information about a frequency band to be used, a transmission destination (the terminal station 7), and a transmission source (the terminal station 6), as well as transmission request information. If the allocation of a frequency band is unavailable (No at Step S4), the feeder link station 4 repeatedly executes the processing at Steps S3 and S4.

After the transmission request signal from the feeder link station 4 is received, if approving the transmission request, the terminal station 7 then transmits a communication approval signal to the feeder link station 4 via the satellite repeater 5 (Step S6). Simultaneously, the terminal station 7 waits a signal from the terminal station 6 with the frequency band instructed in the transmission request signal from the feeder link station 4 (Step S6).

After receiving the communication approval signal from the terminal station 7, the feeder link station 4 transmits relay control information for performing relay control to the satellite repeater 5 such that the satellite repeater 5 can transmit the signal from the terminal station 6 in the service area 1 to the terminal station 7 in the service area 3 (Step S7).

After that, the feeder link station 4 transmits a communication permission signal to the terminal station 6 via the satellite repeater 5 (Step S8). The communication permission signal also includes frequency band information to be used by the terminal station 6 for communications.

The terminal station 6 then starts a communication to the terminal station 7 by using a frequency band instructed in the communication permission signal when receiving the communication permission signal from the feeder link station 4 (Step S9).

To carry out communications for control between the feeder link station 4 and the terminal stations 6 and 7 in the above sequence, fixed channels allocated for the control is used.

It is desirable in recent satellite communications that signals in various bandwidths, such as an audio signal and an image signal, are transmitted and received by efficiently using frequency resources between terminals (and also between the terminals and the feeder link station in a case of a double-hop system). Therefore, it is expected that a high efficiency in communications is achieved and a communication capacity of a system is increased within limited frequency resources flexibly coping with variations in traffic from a low-speed audio signal to a high-speed data communication.

As a conventional technology that achieves an efficient use of the frequency resources, there is a technology described in a non-patent document 1 described below. For example, according to a satellite system using a through repeater satellite, a frequency bandwidth $BW_d$ of a down-link beam in a service area is as follows:

$BWd=$[bandwidth of each up-link beam $BWu$]×[number of service areas]

However, according to the non-patent document 1, the same communication volume as a conventional one is achieved by compressing the frequency bandwidth of the down-link beam through a cluster multiplexing.

FIG. 9 is a schematic diagram that depicts an operation example of a system according to the non-patent document 1. The left graph of the two graphs depicts an operation example of an up-link in each service area, and also depicts an operation example of a down-link when not using a method according to the non-patent document 1. On the other hand, the right graph depicts an operation example of a down-link when using the method according to the non-patent document 1. A vertical axis in each of the graphs indicates the frequency of a down-link beam to the service area 1, and a horizontal axis indicates time.

According to FIG. 9, rectangles A to G indicate all data transmitted to the service area 1 from the service areas 1 to 3 with time and frequency directions. The vertical axis of each of the rectangles indicates a frequency band to be used for transmission of data. The data A and B are transmission data from the service area 1 to the service area 1, the data C and D are transmission data from the service area 2 to the service area 1, and the data E and F are transmission data from the service area 3 to the service area 1. Upward arrows "↑" shown under the time axis in each of the graphs indicate time points at each of which a transmission request for each data is made.

According to a left graph in FIG. 9, the frequency bandwidth BWd required for the down-link to the service area 1 is "BWu×3". On the other hand, according to the method of the non-patent document, frequencies of signals from respective up-links are switched by the satellite repeater 5, the frequencies are rearranged (compressed in the frequency axis direction) such that the frequencies are packed to eliminate unused intervals, and then the signals are transmitted to the service area 1. A right graph in FIG. 9 depicts a state of each data on the down-link when the frequencies are compressed.

The satellite repeater 5 extracts only necessary data from signals from up-links, and packs the signals in the frequency axis direction, so that the down-link frequency bandwidth allocated to the service area 1 from each of the service areas is compressed from BWu to BWc (BWu>BWc). As clearly shown in FIG. 9, the down-link frequency bandwidth to the service area 1 is reduced to BWd'(=BWc×3) from BWd without any trouble in communications because of the rearrangement of frequencies performed by the satellite repeater 5.

In this way, according to the non-patent document 1, the efficiency of use of frequencies is improved by compressing a down-link frequency bandwidth from a satellite when the satellite repeater 5 switches frequencies.

Non-Patent Document 1: "Equipment Technology in Next Generation Mobile Satellite Communication System", Technical Study Report, SAT2003-113, Institute of Electronics, Information and Communication Engineers

DISCLOSURE OF INVENTION

Problem to be Solved by the Invention

However, when compressing a signal in the frequency axis direction as described in the non-patent document 1, there is a problem that if communication traffic from a certain service area to another service area is suddenly increased, a frequency cannot be allocated, consequently a waiting time (queue) of a communication is increased.

For example, the satellite system according to the non-patent document 1, suppose a transmission request for the data G from the service area 3 to the service area 1 is newly made. In this case, according to the non-patent document 1, the bandwidth of the down-link from each service area to the service area 1 is narrowed from BWu to BWc, so that the data G cannot be transmitted from the service area 3 to the service area 1 via the satellite repeater 5 as long as either a communication of the data E or that of the data F has not been finished. The right graph in FIG. 9 depicts a state of starting the transmission of the data G after the transmission of the data E is completed. In this way, according to the conventional system, although frequencies on the up-link side from the service area 3 to the satellite repeater 5 are not fully occupied, the down-link side from the satellite repeater 5 to the service area 1 has no spare frequency, so that a waiting time for a transmission of data is generated, as a result, a system throughput is decreased.

The present invention has been made to solve the above problem, and the object of the present invention is to obtain a satellite communication system that achieves further reduction in a transmission time of data relay.

Means for Solving Problem

To solve the above problems and to achieve the object, in a satellite communication system according to the present invention, a feeder link station allocates frequencies to an up-link (from a transmission source terminal to a relay satellite) and a down-link (from the relay satellite to a transmission destination terminal) in response to a transmission request from a terminal (a transmission source terminal) in any one of a plurality of service areas, and the relay satellite compresses a down-link frequency bandwidth allocated to each of the service areas and relays a communication between the service areas following a relay control by the feeder link station. For example, when a transmission request for new data is issued under a situation where a plurality of data are transmitted to a specific service area from a plurality of service areas, the feeder link station performs a relay control in which the feeder link station searches an available frequency to be allocated to the new data in a down-link frequency band of the specific service area, and when any of data communications is completed, allocates a down-link frequency band used in the data communication as a down-link frequency band for the new data, and the relay satellite arranges the new data on the down-link frequency band right after the data communication is completed following the relay control by the feeder link station.

EFFECT OF THE INVENTION

According to the present invention, time taken for transmission can be reduced to shorter than the conventional technology, and a high efficiency of an up-link can be achieved, so that a communication efficiency of the whole satellite system can be further improved within limited frequency resources.

Figure 1:
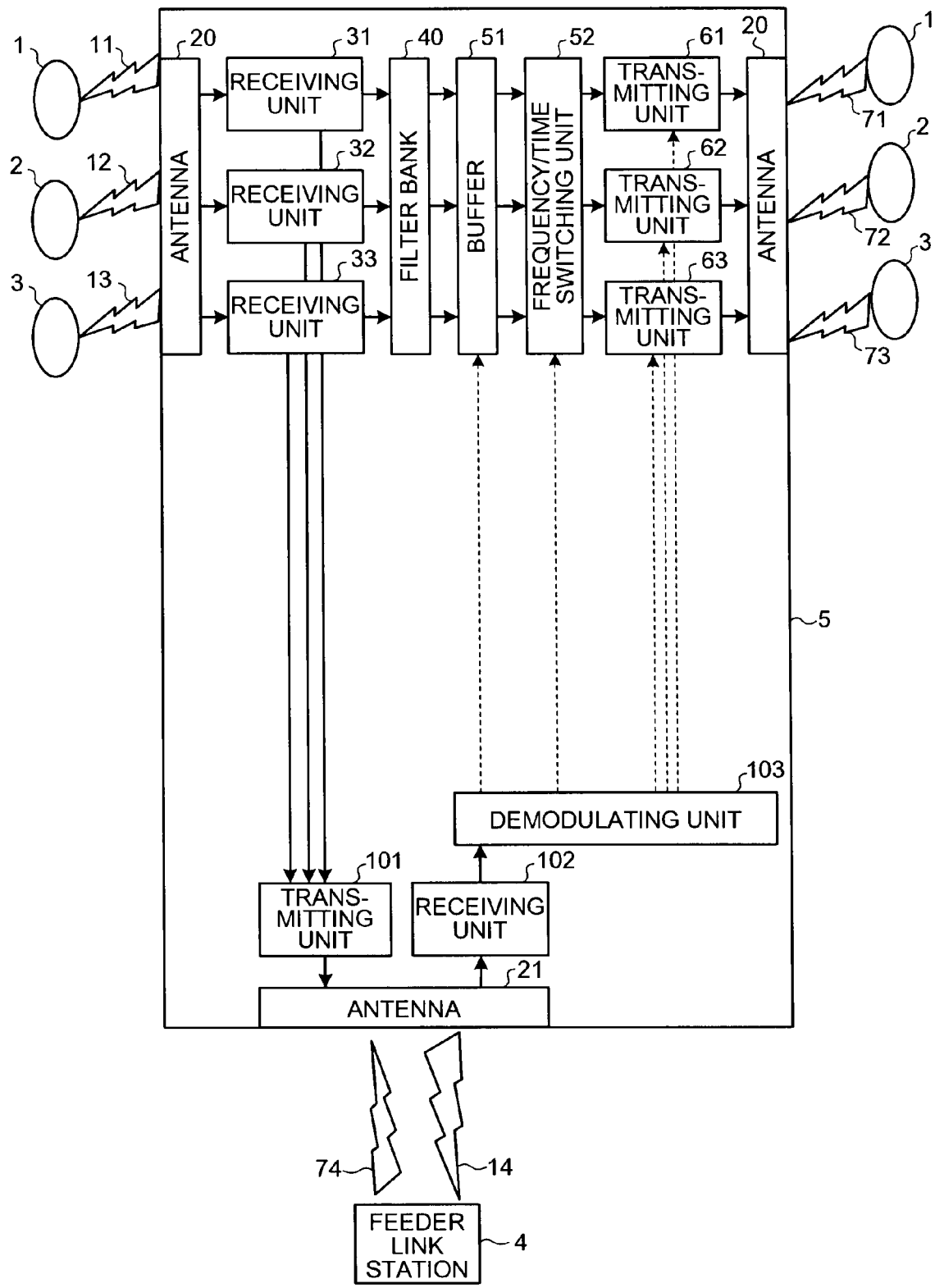
FIG. 1 is a schematic diagram that depicts a configuration example of a satellite communication system according to a first embodiment of the present invention.

EXPLANATIONS OF LETTERS OR NUMERALS 1 to 3 service areas
4 feeder link station
5 satellite repeater
11 to 13, 71 to 73 service links
14, 74 feeder links
20, 21 antennas
31 to 33 receiving units
40 filter bank
51 buffer
52 frequency/time switching unit
61 to 63 transmitting units
101 transmitting unit
102 receiving unit
103 demodulating unit

BEST MODE(S) FOR CARRYING OUT THE INVENTION

Exemplary embodiments of a satellite communication system according to the present invention will be explained below in detail with reference to the drawings. However, the present invention is not limited to the embodiments. A general configuration of the satellite communication system according to each of the embodiments is similarly to the configuration described above with reference to FIG. 7. According to the present invention, an up-link and a down-link are not limited to a service link and a feeder link, and the embodiments are applicable as long as each of the up-link and the down-link are configured as a multi-beam.

First Embodiment

FIG. 1 is a schematic diagram that depicts a configuration of a satellite communication system according to a first embodiment of the present invention. The satellite communication system includes the service areas 1 to 3, the feeder link station 4, the service links 11 to 13, and 71 to 73, the feeder links 14 and 74, and the satellite repeater 5. Among the service links 11 to 13 and 71 to 73, and the feeder links 14 and 74, the service links 11 to 13 and the feeder link 14 are referred to as up-link beams, and the service links 71 to 73 and the feeder link 74 are referred to as down-link beams.

The satellite repeater 5 includes antennas 20 and 21, receiving units 31 to 33, a filter bank 40, a buffer 51, a frequency/time switching unit 52, transmitting units 61 to 63, a transmitting unit 101, a receiving unit 102, and a demodulating unit 103.

Operation of the satellite repeater 5 is explained below. To begin with, data transmitted from the service areas 1 to 3 via the service links 11 to 13 is received by the antenna 20, the received data is down-converted to a baseband from a carrier wave frequency by the receiving units 31 to 33, and further divided into a plurality of frequency bands by the filter bank 40. The divided data are switched (each down-link frequency bandwidth is compressed) by the frequency/time switching unit 52 to cope with the service links 71 to 73, and up-converted to respective carrier wave frequencies by the transmitting units 61 to 63. The up-converted data is transmitted from the antenna 20 to the service areas 1 to 3 by using the service links 71 to 73, respectively. The buffer 51 is configured to save therein data from an up-link and a feeder link temporarily when frequency cannot be allocated to a down-link.

A transmission request signal transmitted from the service areas 1 to 3 is down-converted by the receiving units 31 to 33, then up-converted to a carrier wave frequency of the feeder link 74 (down-link beam) by the transmitting unit 101, and transmitted from the antenna 21 via the feeder link 74 to the feeder link station 4. The feeder link station 4 creates control information, such as a transmission request signal and a communication permission signal, based on data received from the satellite repeater 5, and transmits the created data to the satellite repeater 5 via the feeder link 14 (up-link beam).

The data received by the antenna 21 is down-converted to the baseband by the receiving unit 102, and relay control information in the down-converted data is demodulated by the demodulating unit 103. The demodulated relay control information is input to the frequency/time switching unit 52, and switched by the frequency/time switching unit 52 based on relay control information from the feeder link station 4. The transmission request signal and the communication permission signal from the feeder link station 4 to respective terminal stations are input from the demodulating unit 103 to the transmitting units 61 to 63, and transmitted from the transmitting units 61 to 63 via the antenna 20 and the service links 71 to 73 (down-link beams) to respective terminals. The transmission request signal and the communication permission signal to the respective terminal stations do not need to be modulated by the satellite repeater 5.

Figure 2:
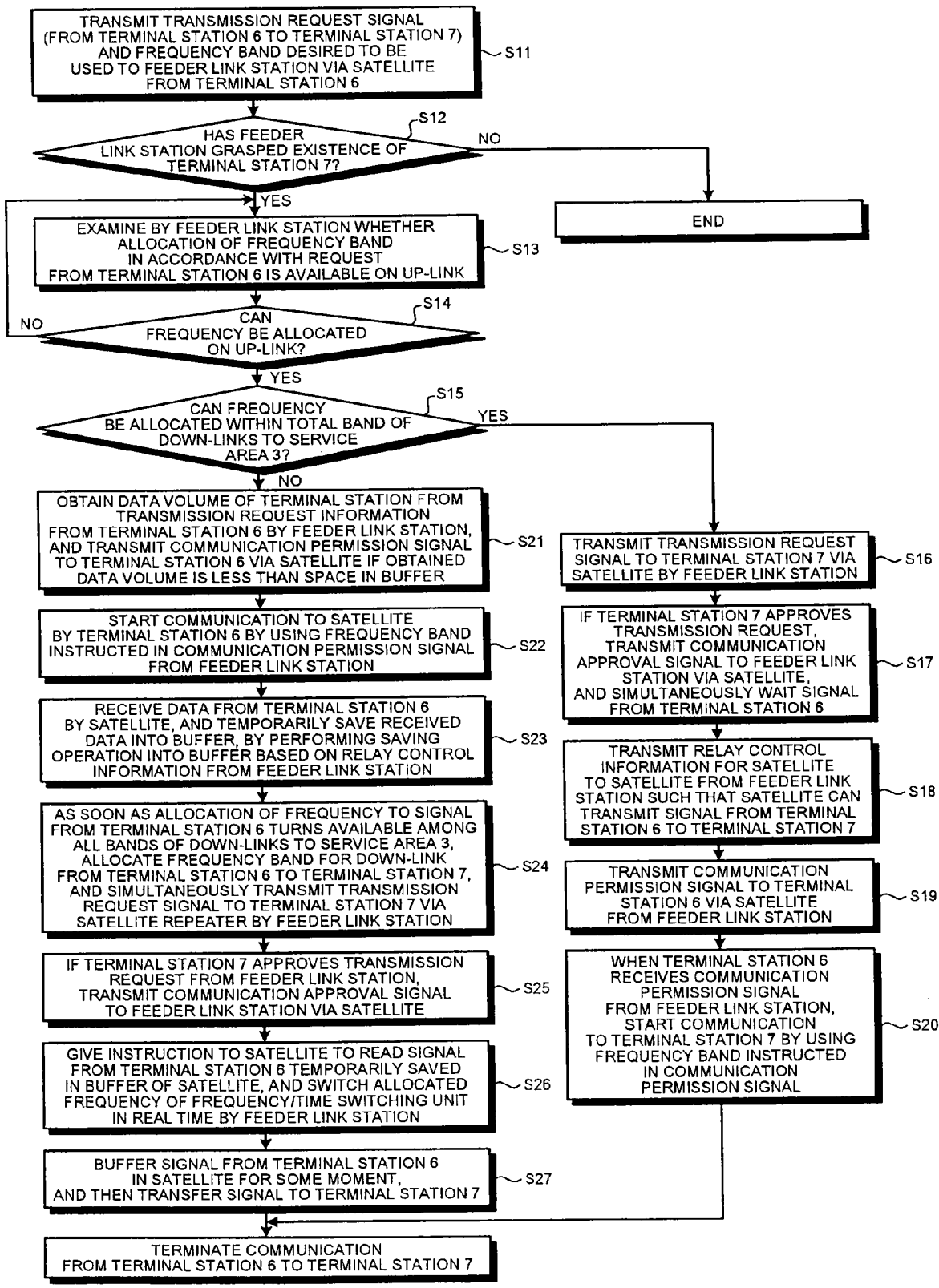
FIG. 2 is a schematic diagram that depicts an example of a concrete communication sequence performed by the satellite communication system.
Figure 7:
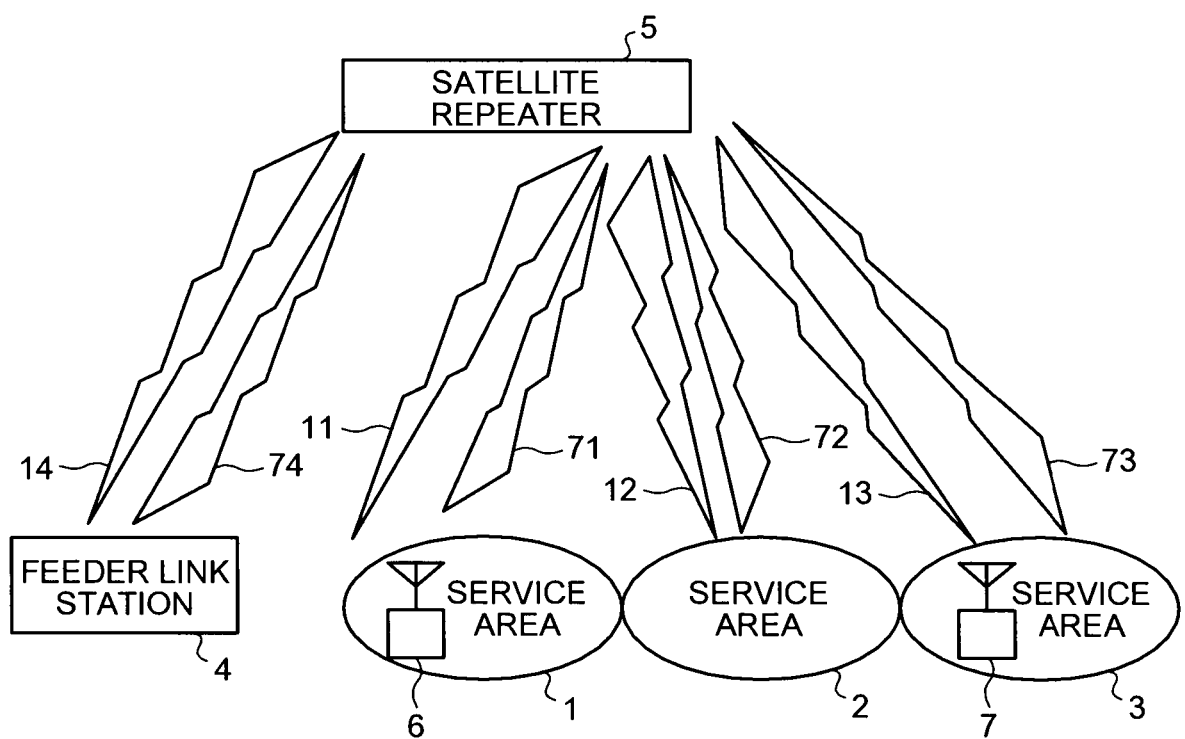
FIG. 7 is a schematic diagram that depicts a general configuration of a satellite communication system.
Figure 8:
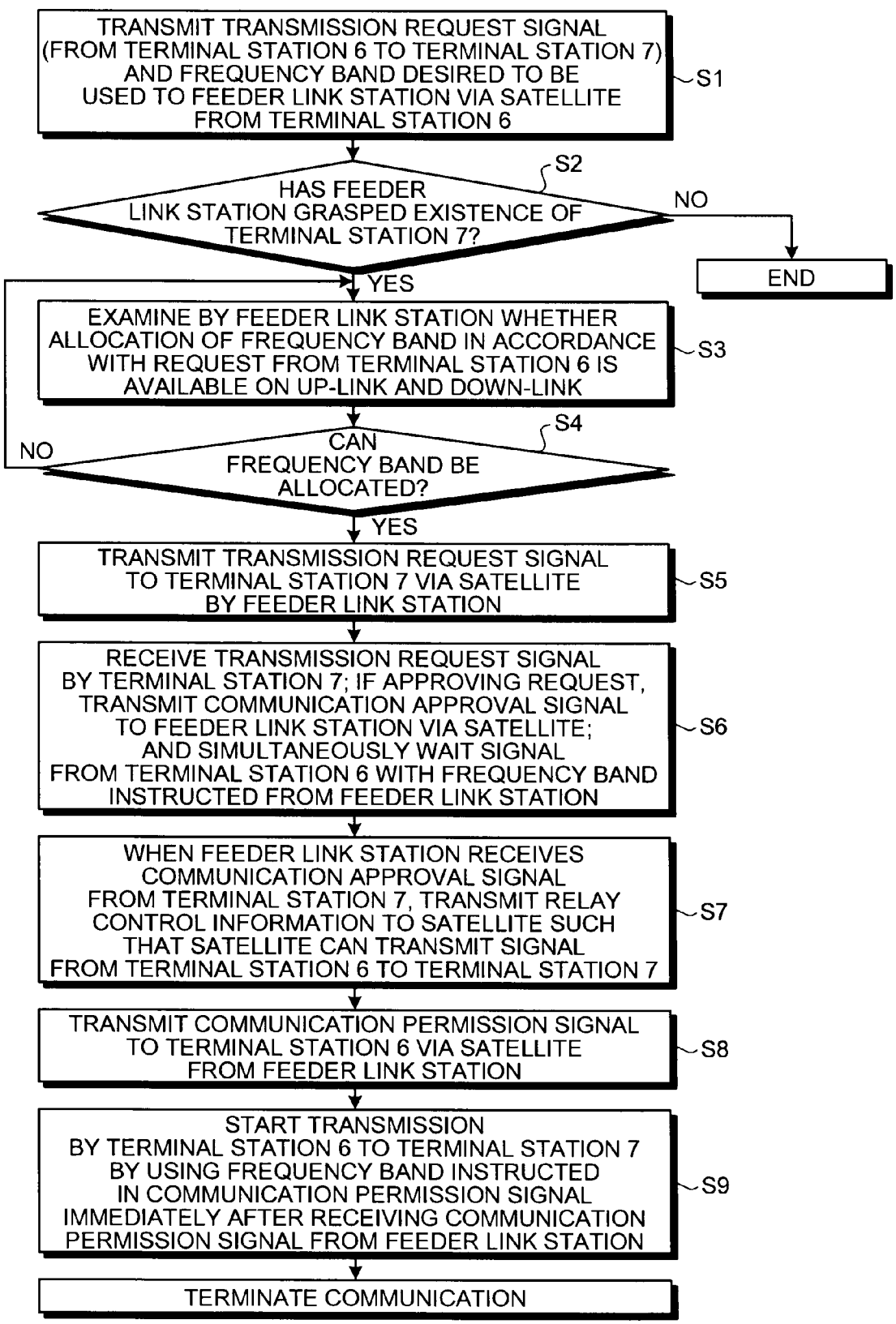
FIG. 8 is a schematic diagram that depicts an example of a communication sequence performed by a conventional satellite communication system.

A concrete communication sequence performed by the satellite communication system is explained below with reference to FIGS. 2 and 7. FIG. 2 is a schematic diagram that depicts a sequence when the terminal station 6 in the service area 1 carries out a communication with the terminal station 7 present in the service area 3, as an example of a concrete communication sequence performed by the satellite communication system.

To begin with, the terminal station 6 in the service area 1 transmits a transmission request signal to the feeder link station 4 (Step S11). The transmission request signal includes information about a bandwidth desired to be used, a transmission time (or a transmission data length), a transmission destination (the terminal station 7), and a transmission source (the terminal station 6), as well as transmission request information.

The feeder link station 4 has grasped all terminals connected to the system, a state of the use of frequencies in each service area, a schedule, for example, between which time points each communication is carried out, and a data volume buffered in the satellite repeater 5. When receiving the transmission request signal from the terminal station 6, the feeder link station 4 examines at first whether the terminal station 7 as the transmission destination exists in the system (Step S12).

If the terminal station 7 exists in the system (Yes at Step S12), the feeder link station 4 examines whether allocation of a frequency band in accordance with the request from the terminal station 6 is available on an up-link (from the terminal station 6 to the satellite repeater 5) (Steps S13 and S14: examining an available up-link frequency). If the terminal station 7 does not exists in the system (No at Step S2), the processing is terminated.

In the next step, when the allocation of a frequency band is available on the up-link (Yes at Step S14), the feeder link station 4 then examines whether allocation of a frequency band is available within a total band of the down-links to the service area 3 (according to the embodiment, BWd'=3BWc) (Step S15), not confirming only availability of a frequency in the band (BWc) on the down-link side from the service area 1 to the service area 3 similarly to the conventional example. If the allocation of a frequency band is unavailable on the up-link (No at Step S14), the feeder link station 4 repeatedly executes the processing at Steps S13 and S14.

If the allocation of a frequency in the processing at Step S15 is available within the total band of the down-links to the service area 3 (Yes at Step S15), the feeder link station 4 transmits a transmission request signal to the terminal station 7 in the service area 3 via the satellite repeater 5 (Step S16). The transmission request signal includes information about a frequency band to be used, a transmission destination (the terminal station 7), and a transmission source (the terminal station 6), as well as transmission request information. When determining a frequency to be used for a communication, it is desirable that the time period after a transmission request is made until a transmission start is the shortest. Therefore, for example, according to FIG. 3, because the finish of a transmission of the data A is the earliest, the data G of which transmission is to be newly started is arranged after the data A.

After the transmission request signal from the feeder link station 4 is received, if approving the transmission request, the terminal station 7 then transmits a communication approval signal to the feeder link station 4 via the satellite repeater 5 (Step S17). Simultaneously, the terminal station 7 waits a signal from the terminal station 6 with the frequency band instructed in the transmission request signal from the feeder link station 4 (Step S17).

After receiving the communication approval signal from the terminal station 7, the feeder link station 4 transmits relay control information for performing relay control to the satellite repeater 5 such that to the satellite repeater 5 can transmit the signal from the terminal station 6 in the service area 1 to the terminal station 7 in the service area 3 (Step S18). The relay control information has an influence specifically on the frequency/time switching unit 52 in the satellite repeater 5.

After that, the feeder link station 4 transmits a communication permission signal to the terminal station 6 via the satellite repeater 5 (Step S19). The communication permission signal also includes frequency band information to be used by the terminal station 6 for communications.

The terminal station 6 then starts a communication to the terminal station 7 by using a frequency band instructed in the communication permission signal when receiving the communication permission signal from the feeder link station 4 (Step S20).

By contrast, if the allocation of a frequency in the processing at Step S15 is unavailable in the total band of the down-links to the service area 3 (No at Step S15), the feeder link station 4 instructs the terminal station 6 to carry out only an up-link transmission from the terminal station 6 to the satellite repeater 5 for the time being. Specifically, the feeder link station 4 obtains at first a data volume of the terminal station 6 from the transmission request information from the terminal station 6, and if the data volume is less than a space in the buffer 51, the feeder link station 4 transmits a communication permission signal to the terminal station 6 in the service area 1 via the satellite repeater 5 (Step S21). The transmission request signal includes information about a frequency band to be used, a transmission destination (the terminal station 7), and a transmission source (the terminal station 6), as well as transmission request information.

When receiving the communication permission signal from the feeder link station 4, the terminal station 6 starts a communication to the satellite repeater 5 by using a frequency band instructed in the communication permission signal (Step S22).

When receiving the data from the terminal station 6, the satellite repeater 5 temporarily saves the received data into the buffer 51 (Step S23). Saving operation into the buffer 51 is performed in accordance with the relay control information from the feeder link station 4.

The feeder link station 4 searches the all bands of the down-links to the service area 3, and as soon as allocation of a frequency to a signal from the terminal station 6 turns available, the feeder link station 4 allocates the frequency band for the down-link from the terminal station 6 to the terminal station 7, and simultaneously transmits a transmission request signal to the terminal station 7 in the service area 3 via the satellite repeater 5 (Step S24). The transmission request signal includes information about a frequency band to be used, a transmission destination (the terminal station 7), and a transmission source (the terminal station 6), as well as transmission request information.

After the transmission request signal from the feeder link station 4 is received, if approving the transmission request, the terminal station 7 transmits a communication approval signal to the feeder link station 4 via the satellite repeater 5 (Step S25). Simultaneously, the terminal station 7 waits a signal from the terminal station 6 with the frequency band instructed in the transmission request signal from the feeder link station 4.

After receiving the communication approval signal from the terminal station 7, the feeder link station 4 gives an instruction to the satellite repeater 5 to read the signal from the terminal station 6 temporarily saved in the buffer 51 of the satellite repeater 5, and switches a frequency of the frequency/time switching unit 52 in real time such that the saved signal can be transmitted from the satellite repeater 5 to the terminal station 7 in the service area 3 (Step S26).

Eventually, the signal transmitted from the terminal station 6 in the service area 1 is buffered in the satellite repeater 5, added with a delay more or less, and then transferred to the terminal station 7 in the service area 3 (Step S27).

In this way, a transmission request to the terminal station 7 in the service area 3, a communication approval to the feeder link station 4, and a transmission on the up-link side carried out by using the control channels are carried out before allocation of a down-link frequency becomes available at Step S24, so that a higher efficiency in communications particularly on the up-link side can be achieved.

Figure 3:
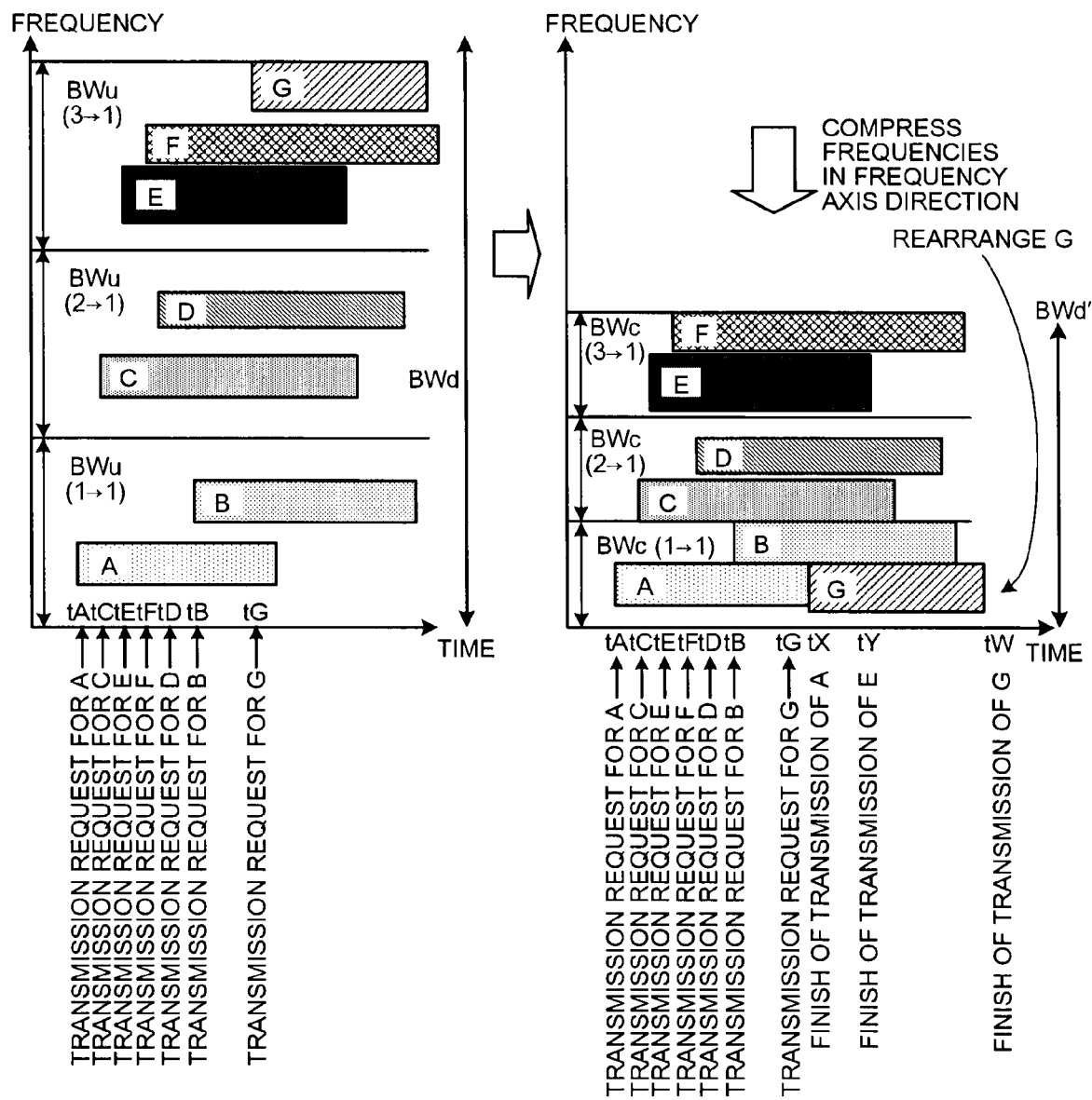
FIG. 3 is a schematic diagram that depicts an operation example according to the first embodiment.
Figure 9:
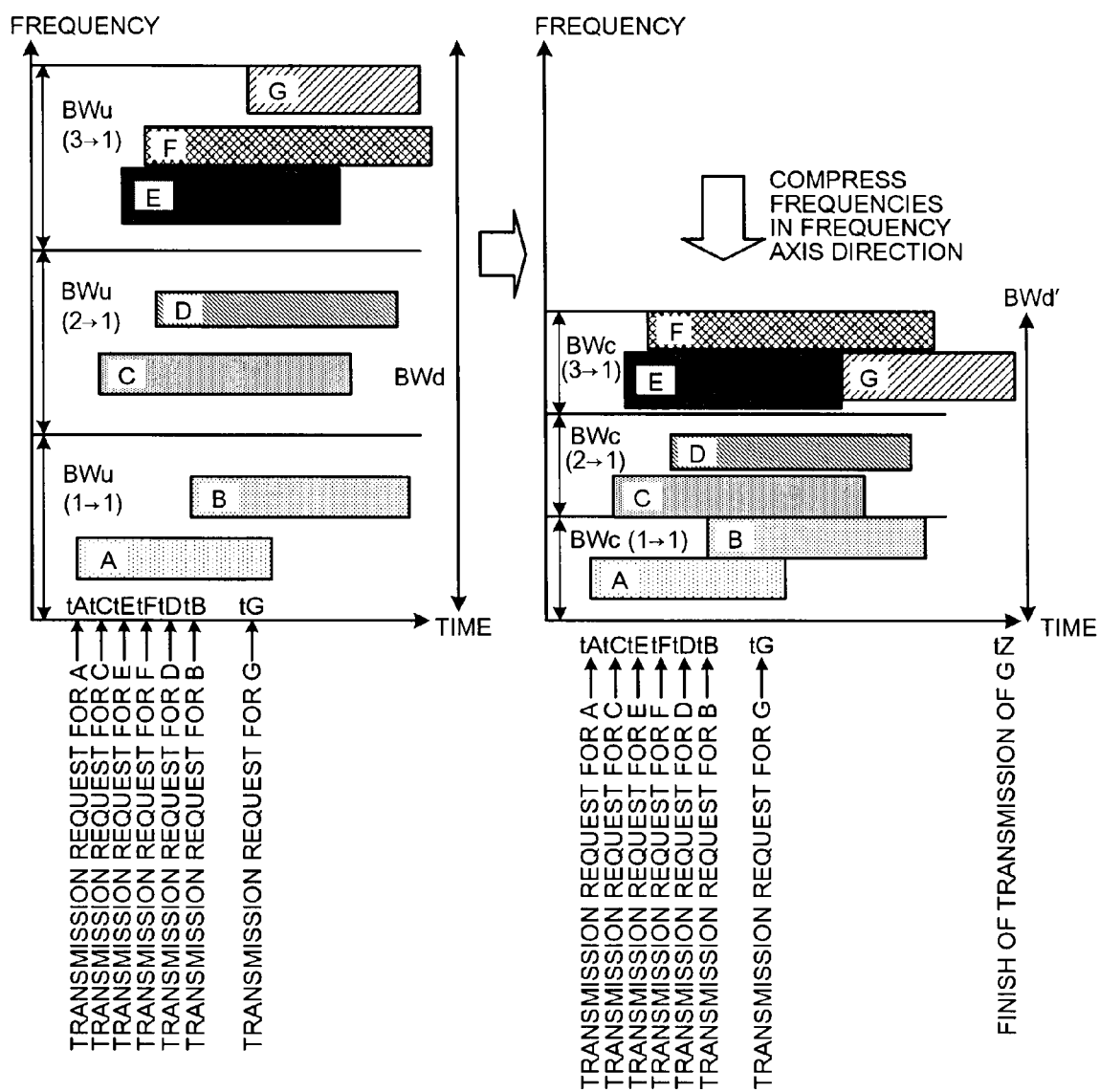
FIG. 9 is a schematic diagram that depicts an operation of a system according to a non-patent document 1.

FIG. 3 is a schematic diagram that depicts an operation example according to the first embodiment based on the above communication sequence. FIG. 3 depicts an example when a transmission request for the data G is made at time tG under the same conditions as those in FIG. 9 and under a state where the data A to F are being sent to the service area 1.

In this case, although because the down-link frequency BWd' is fully used by the other communications at the time tG, the data G cannot be transmitted on the down-link side;

however, the buffer 51 is available on the up-link side, so that an up-link transmission of the data G is carried out. In this way, even if communication on the down-link side cannot be carried out, but if a communication on the up-link side is sendable, the efficiency in communications on the up-link side can be improved by starting only an up-link transmission ahead.

The data G is to be temporarily saved into the buffer 51 of the satellite repeater 5, and the satellite repeater 5 reads and transmits the data G saved in the buffer 51 immediately after time tX at which the transmission of the data A having been carried out between the terminals in the service area is completed. Accordingly, a waiting time of the data G, which is conventionally unable to be transmitted until the transmission of the data E is finished (time tY), can be reduced by (tY-tX). Additionally, a time for finishing transmissions of the data A to G can be reduced by (tZ-tW).

Thus, according to the embodiment, a time required for transmissions can be shorter than the conventional technology, and a higher efficiency of an up-link can be achieved, so that a communication efficiency of the whole satellite communication system can be further improved within limited frequency resources.

The embodiment is not limited to the above configuration, and, for example, can be configured not to include the buffer 51. In such case, a higher efficiency of an up-link cannot be achieved; however, system architecture can be simplified because Steps S21 to S27 are not needed when the buffer 51 is not provided.

The processing according to the embodiment is an invention for efficiently using unoccupied frequency bands, so that, for example, a sub-carrier in a multi-carrier communication, such as OFDMA, can be efficiently used.

Second Embodiment

Operation according to a second embodiment is explained below. A configuration example of a satellite communication system is similar to the first embodiment as described above. The embodiment is explained below about processing different from the first embodiment.

Figure 4:
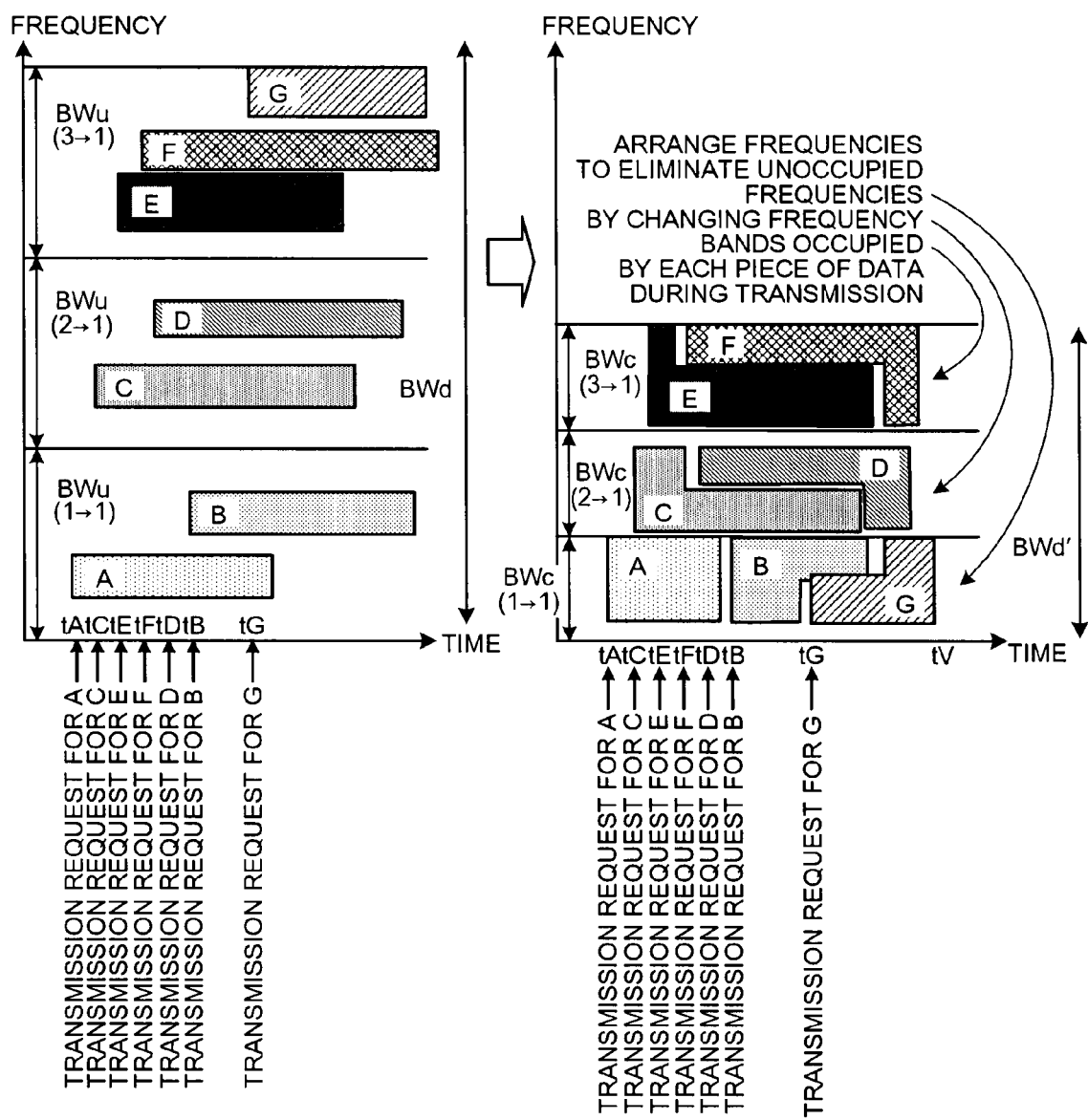
FIG. 4 is a schematic diagram that depicts an operation example according to a second embodiment.

FIG. 4 is a schematic diagram that depicts an operation example according to the second embodiment. Similarly to FIG. 3 of the first embodiment, FIG. 4 depicts an example when a transmission request for the data G is made at the time tG under the same conditions as those in FIG. 9, and under a state where the data A to F are being sent to the service area 1.

According to the embodiment, the satellite communication system is configured such that frequency bands occupied by data in communication are packed to eliminate unoccupied frequencies by changing the frequency bands during transmission, and frequency switching process can be performed in real time. For example, according to FIG. 4, a transmission time of each of the data A to G is reduced by occupying a spare frequency with each of data in communication such that unused segment is not generated in an allocated frequency band when rearranging the data A to G. Accordingly, a time for finishing transmissions of the data A to G can be reduced by (tW-tV). It is assumed that the data A to G are packets in which information required for communications, for example, a volume of data and a transmission rate, are incorporated.

A concrete communication sequence performed by the satellite communication system is explained below with reference to FIG. 2 described above. Only different part from the communication sequence shown in FIG. 2 is explained below.

First of all, Steps S11 to S14 are similar to the first embodiment. Then, if allocation of a frequency is available on the up-link side (Yes at Step S14), and if allocation of a frequency is available within the total band of the down-links to the service area 3 (Yes at Step S15), the feeder link station 4 performs control of allocating a frequency band as wide as possible in a total frequency band (BWd') for the down-link from the terminal station 6 to the terminal station 7 when allocating a frequency on the down-link side (see FIG. 4). To achieve this, according to the second embodiment, differently from the first embodiment, a communication permission signal and a transmission request signal include two-dimensional information about a frequency band to be used and a time zone to be used. The following processing at Steps S16 to S20 is similar to the first embodiment.

By contrast, if the allocation of a frequency band is available on the up-link (Yes at Step S14), but the allocation of a frequency is unavailable within the total band of the down-links (No at Step S15), the feeder link station 4 temporarily saves data on the up-link side into the buffer 51 similarly to the first embodiment, and performs control of transmitting the data in the buffer 51 onto the down-link side when the allocation of a frequency turns available within the total band of the down-links. At that time, the feeder link station 4 performs control of allocating a frequency band as wide as possible in the total frequency band (BWd') for the down-link from the terminal station 6 to the terminal station 7 (see FIG. 4). The following processing at Steps S21 to S27 is similar to the first embodiment.

After that, according to the embodiment, the feeder link station 4 regularly notifies each terminal station currently in communication of used-channel change information for instructing the terminal station to change information about a frequency band and a time zone to be used, in accordance with the transmission request.

When receiving the used-channel change information from the feeder link station 4, each terminal station in communication changes the frequency band and the time zone in use by using the received information.

In this way, according to the embodiment, it is configured such that the feeder link station 4 grasps as packets a transmission start time-point and a finish time-point of each of the data, and a time-point at which the frequency band occupied by the data is changed, and the satellite repeater 5 allocates a frequency band as wide as possible in the down-link frequency band for the down-link to a terminal station based on the information in the packets. Accordingly, transmissions of the data A to G can be finished earlier than by the conventional system.

Figure 5:
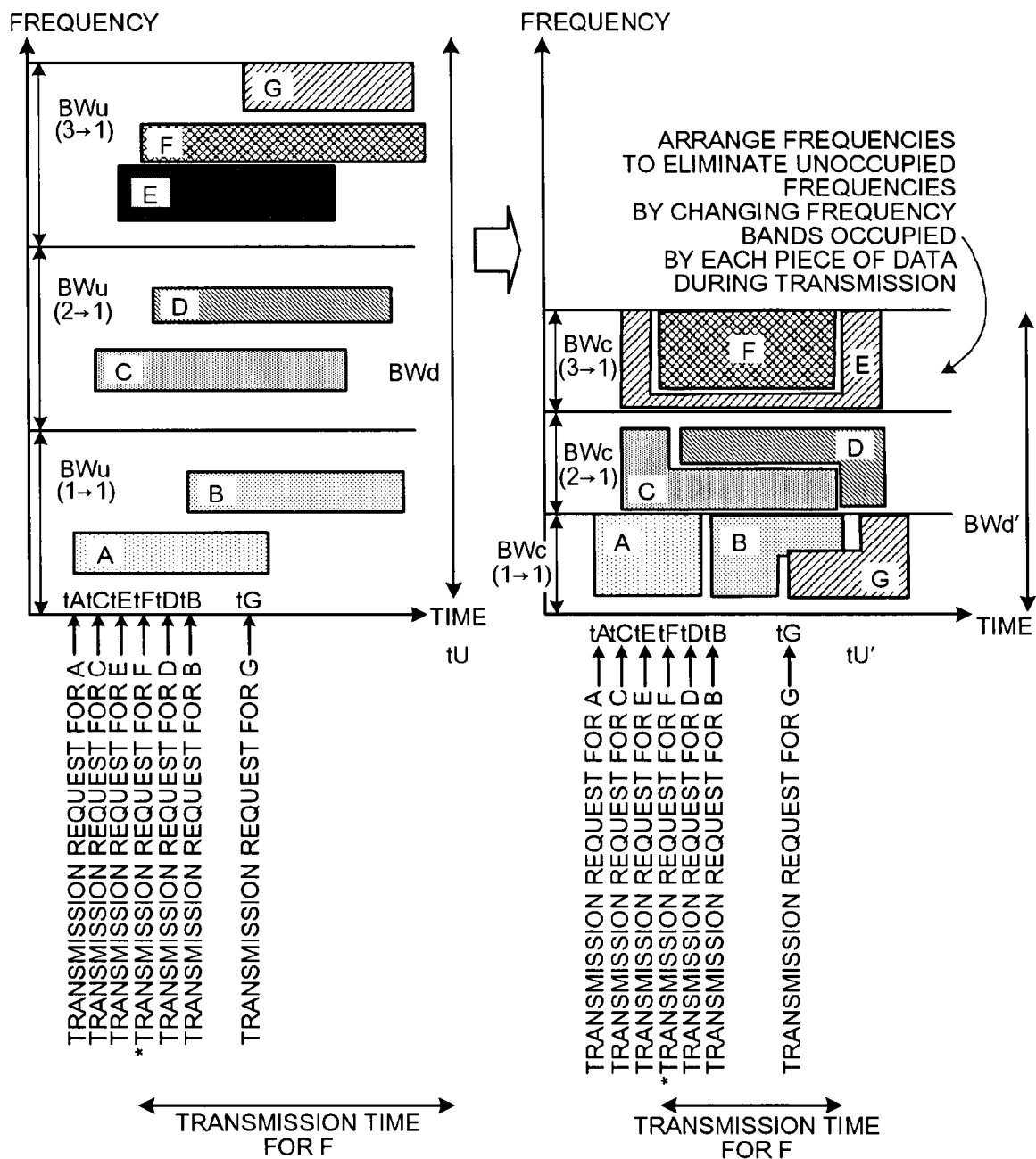
FIG. 5 is a schematic diagram that depicts an operation example according to the second embodiment.

According to the embodiment, if a transmission request to transmit data urgently is made by a terminal station, allocation to such urgent communication can be given a high priority. FIG. 5 depicts a situation of such urgent communication. For example, suppose the data F shown on the left in FIG. 5 is an urgent transmission request. According to the embodiment, frequencies are rearranged as shown on the right in FIG. 5 to create no waiting time for a data transmission in response to the urgent transmission request F, and to finish the transmission early. Accordingly, a conventional transmission time taken for the data F (tU-tF) can be reduced to (tU'-tF). In this way, by introducing precedences in arrangement of data, the total transmission time can be the shortest, and data having a higher urgency (the data F) can be preferentially transmitted.

Although the second embodiment described above is that the all frequency bands on the down-link side are efficiently used, similarly, improvement in the efficiency of frequency use and reduction in waiting time on the up-link side can be achieved as the feeder link station 4 performs control of packing frequencies into frequency bands occupied by data to eliminate unoccupied frequencies in the frequency bands on the up-link side (BWu) of the service areas. In such case, the feeder link station 4 performs control of allocating to each terminal station a frequency band as wide as possible within the up-link frequency band (BWu) in response to a transmission request signal from each terminal station in a service area.

Third Embodiment

A third embodiment is explained below in a case where data is a non-packet signal. A configuration example of a satellite communication system is similar to the first embodiment as described above. The embodiment is explained below about processing different from the first or second embodiment.

For example, when data is a non-packet signal, it is conceivable that the feeder link station 4 cannot grasp a transmission finish time-point of the non-packet signal. Therefore, according to the embodiment, the processing shown in FIG. 2 is changed as described below. A case where transmission signals from the terminal station 6 and a terminal station 6' (another terminal station in the service area 1) are non-packet signals is explained below. For example, suppose the data E in FIG. 4 is a non-packet signal. It is assumed below that while the terminal station 6 is transmitting the non-packet data E, the terminal station 6' makes a communication request for data (the data F) to the terminal station 7.

First of all, Steps S11 to S14 described above are performed between the terminal station 6' and the feeder link station 4. However, because the non-packet data E occupies all of allocated frequency bands (BWc (3 to 1)) (see the right side of FIG. 4), the feeder link station 4 transmits a request to change frequency allocation to the terminal station 6 via the satellite repeater 5.

When receiving the request to change frequency allocation, the terminal station 6 performs processing of narrowing a transmission frequency band.

Then, when confirming that the terminal station 6 has narrowed the transmission frequency band, the feeder link station 4 gives a transmission start instruction to the terminal station 6'. In addition, the feeder link station 4 notifies the terminal station 7 that two kinds of data, namely, the data E and the data F, are allocated to the band having been occupied by the data E until then.

When receiving the transmission start instruction from the feeder link station 4, the terminal station 6' starts a transmission. When receiving the transmission start instruction from the feeder link station 4, the terminal station 6 continues the transmission to the terminal station 7 via the satellite repeater 5 with a frequency band that is narrowed by a band occupied by the data F.

When confirming the finish of the data transmission from the terminal station 6, the feeder link station 4 notifies the terminal station 6' and the terminal station 7 that the terminal station 6' is to transmit data to the terminal station 7 by using the whole band. Detection of the finish of the data transmission can be performed by determining whether there is data input into the buffer 51.

Finally, when receiving information that the terminal station 6' is to transmit data to the terminal station 7 by using the whole band, the terminal station 6' transmits the data F to the terminal station 7 via the satellite by using the whole band.

In this way, according to the embodiment, the above processing can achieve a higher efficiency in time similarly to the second embodiment even in a case of a non-packet communication.

Fourth Embodiment

Figure 6:
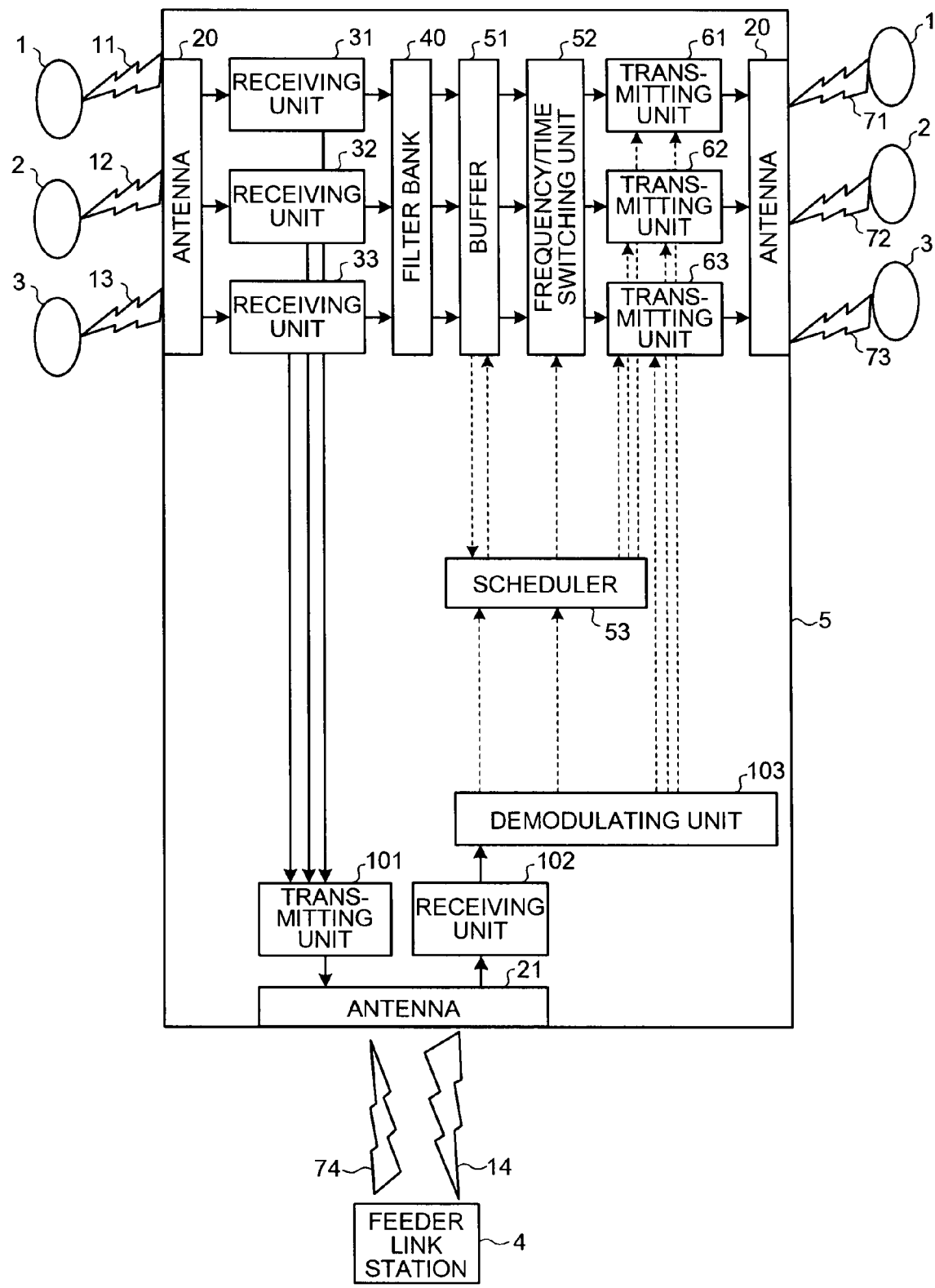
FIG. 6 is a schematic diagram that depicts a configuration example of a satellite communication system according to a fourth embodiment of the present invention.

FIG. 6 is a schematic diagram that depicts a configuration example of a satellite communication system according to a fourth embodiment of the present invention, and a scheduler 53 is added to the configuration according to the first to third embodiments. The fourth embodiment is configured to achieve a higher efficiency than the third embodiment.

For example, when performing the processing as described in the third embodiment, a higher efficiency in time can be expected as the satellite repeater 5 is configured as shown in FIG. 6. Such effect is explained below with reference to the right side of FIG. 4.

The scheduler 53 receives from the feeder link station 4 a transmission request signal and a communication approval signal from a terminal station as occasion arises. Under such state, when the scheduler 53 is notified at a time-point tF from the feeder link station 4 that the feeder link station 4 intends to transmit the data F while monitoring a transmission finish of the non-packet data E shown on the right in FIG. 4, the scheduler 53 allocates a frequency band (BWc) that has become unoccupied to the data F immediately after confirming the transmission finish of the non-packet data E (for example, based on information from the buffer 51), without waiting a control signal from the feeder link station 4. The scheduler 53 then transmits a command signal to respective transmitting unit such that the terminal station 6' and the terminal station 7 transmits and receive data by using the unoccupied frequency band.

In addition, the scheduler 53 simultaneously notifies the feeder link station 4 of the allocation. Accordingly, the feeder link station 4 can grasp the state of frequency allocation to each channel in real time, even when the scheduler 53 separately allocates a frequency.

Although, for example, according to the third embodiment, to change a transmission frequency band, communications are carried out between the feeder link station 4 and the satellite repeater 5 a plurality of number of times; by performing the above operations according to the fourth embodiment, the processing performed by the scheduler 53 can reduce the number of times of communications between the satellite repeater 5 and the feeder link station 4, thereby achieving further reduction in the transmission time.

INDUSTRIAL APPLICABILITY

As described above, the satellite communication system according to the present invention is useful for satellite communications controlled by a feeder link station, and particularly suitable as an application technology for achieving improvement in efficiency in the use of frequencies by compressing a frequency bandwidth of a down-link from a satellite.

The invention claimed is:
1. A satellite communication system comprising:
a feeder link station that issues a relay control by performing an up-link frequency allocation and a down-link frequency allocation in response to a transmission request received from a transmission source terminal in any one of a plurality of service areas; and
a satellite repeater that compresses a down-link frequency bandwidth allocated to each of the service areas and relays a communication between the service areas following receipt of the relay control by the feeder link station, the satellite repeater being separate from the feeder link station and communicating with the feeder link station via a feeder link, wherein when the satellite repeater receives from the transmission source terminal a transmission request for new data that specifies a requested bandwidth to be used under a situation where a plurality of data are transmitted to a specific service area from the plurality of service areas, the satellite repeater converts a format of the transmission request and transmits the converted transmission request to the feeder link station via the feeder link, and when the feeder link station receives the converted transmission request, the feeder link station initially determines whether an up-link frequency band from the transmission source terminal to the satellite repeater corresponding to the requested bandwidth is available, when it is determined that the up-link frequency band is available, the feeder link station then determines whether a down-link frequency band included in a down-link frequency bandwidth of the specific service area corresponding to the requested bandwidth is available to be allocated to the new data, and when the down-link frequency band included in the down-link frequency bandwidth of the specific service area is determined to be available, the feeder link station allocates a down-link frequency band used in any of data communication to the specific service area as the down-link frequency band for the new data and transmits the relay control to the satellite repeater via the feeder link, and the satellite repeater receives the relay control from the feeder link station via the feeder link, converts a format of the relay control, and arranges the new data on the down-link frequency band right after the data communication is completed, according to the relay control received from the feeder link station.

2. The satellite communication system according to claim 1, wherein when the feeder link station determines that the down-link frequency band is not available to be allocated to the new data, the feeder link station instructs the transmission source terminal to perform an up-link data transmission first, and instructs the satellite repeater to temporarily save the up-link data from the transmission source terminal, and when any of the data communications is completed, the satellite repeater reads the new data from the buffer, and arranges the new data on the down-link frequency band right after the data communication is completed, following the relay control by the feeder link station.

3. The satellite communication system according to claim 1, wherein under a situation that a plurality of data are transmitted from a plurality of service areas to the specific service area, the feeder link station changes a down-link frequency band occupied by each of the data in communication such that there is no unused segment in down-link frequency bands occupied by the data.

4. The satellite communication system according to claim 3, wherein when changing the down-link frequency band, the feeder link station rearranges the down-link frequency band in accordance with a priority of data to be transmitted.

5. The satellite communication system according to claim 3, wherein when data to be transmitted to the specific service area is a non-packet signal, the feeder link station detects an end of the data and a transmission request for unsent data, upon detecting the transmission request for the unsent data, performs a relay control such that a down-link frequency is allocated to the unsent data by changing a down-link frequency band occupied by the data in transmission, and upon detecting the end of data in transmission, further performs a relay control such that a down-link frequency band occupied by other data in transmission is changed to avoid any unused segment in the down-link frequency band.

6. The satellite communication system according to claim 4, wherein when data to be transmitted to the specific service area is a non-packet signal, the feeder link station detects an end of the data and a transmission request for unsent data, upon detecting the transmission request for the unsent data, performs a relay control such that a down-link frequency is allocated to the unsent data by changing a down-link frequency band occupied by the data in transmission, and upon detecting the end of data in transmission, further performs the relay control such that a down-link frequency band occupied by other data in transmission is changed to avoid any unused segment in the down-link frequency band.

7. The satellite communication system according to claim 5, wherein when data to be transmitted to the specific service area is the non-packet signal, the satellite repeater includes a scheduler that detects an end of data in transmission and a transmission request for unsent data and schedules the down-link frequency, and upon detecting the transmission request and the end of the data in transmission, the scheduler allocates a down-link frequency to the unsent data without waiting for the relay control from the feeder link station.

8. The satellite communication system according to claim 6, wherein when data to be transmitted to the specific service area is the non-packet signal, the satellite repeater includes a scheduler that detects an end of data in transmission and a transmission request for unsent data and schedules the down-link frequency, and upon detecting the transmission request and the end of the data in transmission, the scheduler allocates a down-link frequency to the unsent data without waiting for the relay control from the feeder link station.

9. A satellite communication method, implemented on a satellite communication system that includes a feeder link station and a satellite repeater, comprising:

issuing a relay control, at the feeder link station, by performing an up-link frequency allocation and a down-link frequency allocation in response to a transmission request received from a transmission source terminal in any one of a plurality of service areas; and compressing, at the satellite repeater, a down-link frequency bandwidth allocated to each of the service areas and relaying a communication between the service areas following the relay control, the satellite repeater being separate from the feeder link station and communicating with the feeder link station via a feeder link, wherein when the satellite repeater receives from the transmission source terminal a transmission request for new data that specifies a requested bandwidth to be used under a situation where a plurality of data are transmitted to a specific service area from the plurality of service areas, the satellite repeater converts a format of the transmission request and transmits the converted transmission request to the feeder link station via the feeder link, and when the feeder link station receives the converted transmission request, the feeder link station initially determines whether an up-link frequency band from the transmission source terminal to the satellite repeater corresponding to the requested bandwidth is available, when it is determined that the up-link frequency band is available, the feeder link station then determines whether a down-link frequency band included in a down-link frequency bandwidth of the specific service area corresponding to the requested bandwidth is available to be allocated to the new data, and when the down-link frequency band included in the down-link frequency bandwidth of the specific service area is determined to be available, the feeder link station allocates a down-link frequency band used in any of data communication to the specific service area as the down-link frequency band for the new data and transmits the relay control to the satellite repeater via the feeder link; and receiving, at the satellite repeater, the relay control from the feeder link station via the feeder link;

converting, at the satellite repeater, a format of the relay control; and arranging, at the satellite repeater, the new data on the down-link frequency band right after the data communication is completed, according to the relay control received from the feeder link station.

10. The satellite communication system according to claim 1, wherein the feeder link station determines each terminal that is connected to the satellite communication system, determines a state of the up-link frequency and the down-link frequency for each of the plurality of service areas, determines a data volume buffered in the satellite repeater, and when the feeder link station receives the converted transmission request specifying a destination terminal, the feeder link station determines whether the destination terminal is connected to the satellite communication system prior to determining bandwidth allocation.

* * * * *